United States Patent
Deems

Patent Number: 5,272,416
Date of Patent: Dec. 21, 1993

[54] HEADLIGHT EXTENDER AND INTENSIFIER

[76] Inventor: George W. Deems, 214 E. St., Mt. Lake Park, Md. 21550

[21] Appl. No.: 889,307

[22] Filed: May 28, 1992

[51] Int. Cl.⁵ .................................................. H02J 1/00
[52] U.S. Cl. ...................................... 315/82; 315/291; 307/10.8
[58] Field of Search ................... 315/291, 82; 307/10.8

[56] References Cited

U.S. PATENT DOCUMENTS

| | | | |
|---|---|---|---|
| 2,918,604 | 12/1959 | Johnston | 315/82 |
| 3,262,011 | 7/1966 | Cones | 315/82 |
| 4,105,898 | 8/1978 | Farler et al. | 315/82 |
| 4,617,496 | 10/1986 | Samodovitz | 315/291 |
| 4,835,406 | 5/1989 | Ronndahl | 307/10.8 |
| 4,979,072 | 12/1990 | Ito et al. | 370/10.8 |

*Primary Examiner*—Robert J. Pascal
*Assistant Examiner*—Michael Shingleton
*Attorney, Agent, or Firm*—S. Michael Bender

[57] ABSTRACT

In a vehicle headlight having a low beam filament and a high beam filament, a resistor is installed between the filaments so that some electrical power is provided to the high beam filament when only the low beam filament is activated. This facilitates a preheating of the high beam filament to prevent damage to the filament upon an activation of the high beam circuit. In a modified embodiment, a relay is utilized to activate both filaments simultaneously when the high beam circuit is actuated so as to increase light intensity of the headlight. In a further embodiment, the resistor is replaced by an adjustable rheostat to control the degree of filament heating.

2 Claims, 5 Drawing Sheets

HEADLIGHT EXTENDER AND INTENSIFIER

BACKGROUND OF THE INVENTION

1. Field of the Invention

The present invention relates to vehicle headlight circuits and more particularly pertains to a preheating method and apparatus for a high beam filament associated with a vehicle headlight.

2. Description of the Prior Art

The use of dual filament vehicle headlights is well known in the prior art. At the present time, only the low beam filament is activated when the associated low beam circuit of the headlight is utilized. Upon an activation of the high beam circuit, a high beam filament is provided with power while all power is removed from the low beam filament. Quite frequently, this sudden burst of electrical energy to the high beam filament results in substantial temperature shock damage whereby the expected use life of the high beam filament is reduced. The high beam filament damage is occasioned by the sudden change in temperature resulting from the activation of the electrical energy source from the high beam circuit. Additionally, utilizing only the high beam filament to achieve high intensity light results in substantial cooling and heating changes for the low beam filament and accordingly, there appears to be a need to normalize the temperatures between the filaments while also providing for increased headlight intensity. In this respect, the present invention substantially fulfills this need.

SUMMARY OF THE INVENTION

In view of the foregoing disadvantages inherent in the known types of dual filament headlights now present in the prior art, the present invention provides an improved dual filament headlight assembly construction wherein both the low beam and high beam filaments are maintained in a near equal temperature relationship while increased light intensity if obtained whenever the high beam actuation circuit is activated. As such, the general purpose of the present invention, which will be described subsequently in greater detail, is to provide a new and improved dual filament headlight bulb which has all the advantages of the prior art dual filament headlight bulbs and none of the disadvantages.

To attain this, the present invention essentially comprises a vehicle headlight having a low beam filament and a high beam filament wherein a resistor is installed between the filaments so that some electrical power is provided to the high beam filament when only the low beam filament is activated. This facilitates a preheating of the high beam filament to prevent damage to the filament upon an activation of the high beam circuit. In a modified embodiment, a relay is utilized to activate both filaments simultaneously when the high beam circuit is actuated so as to increase light intensity of the headlight. In a further embodiment, the resistor is replaced by an adjustable rheostat to control the degree of filament heating.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dual filament headlight which has all the advantages of the prior art improved dual filament headlights and none of the disadvantages.

It is another object of the present invention to provide a new and improved dual filament headlight which may be easily and efficiently manufactured and marketed.

It is a further object of the present invention to provide a new and improved dual filament headlight which is of a durable and reliable construction.

An even further object of the present invention is to provide a new and improved dual filament headlight which is susceptible of a low cost of manufacture with regard to both materials and labor, and which accordingly is then susceptible of low prices of sale to the consuming public, thereby making such improved dual filament headlights economically available to the buying public.

Still yet another object of the present invention is to provide a new and improved dual filament headlight which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
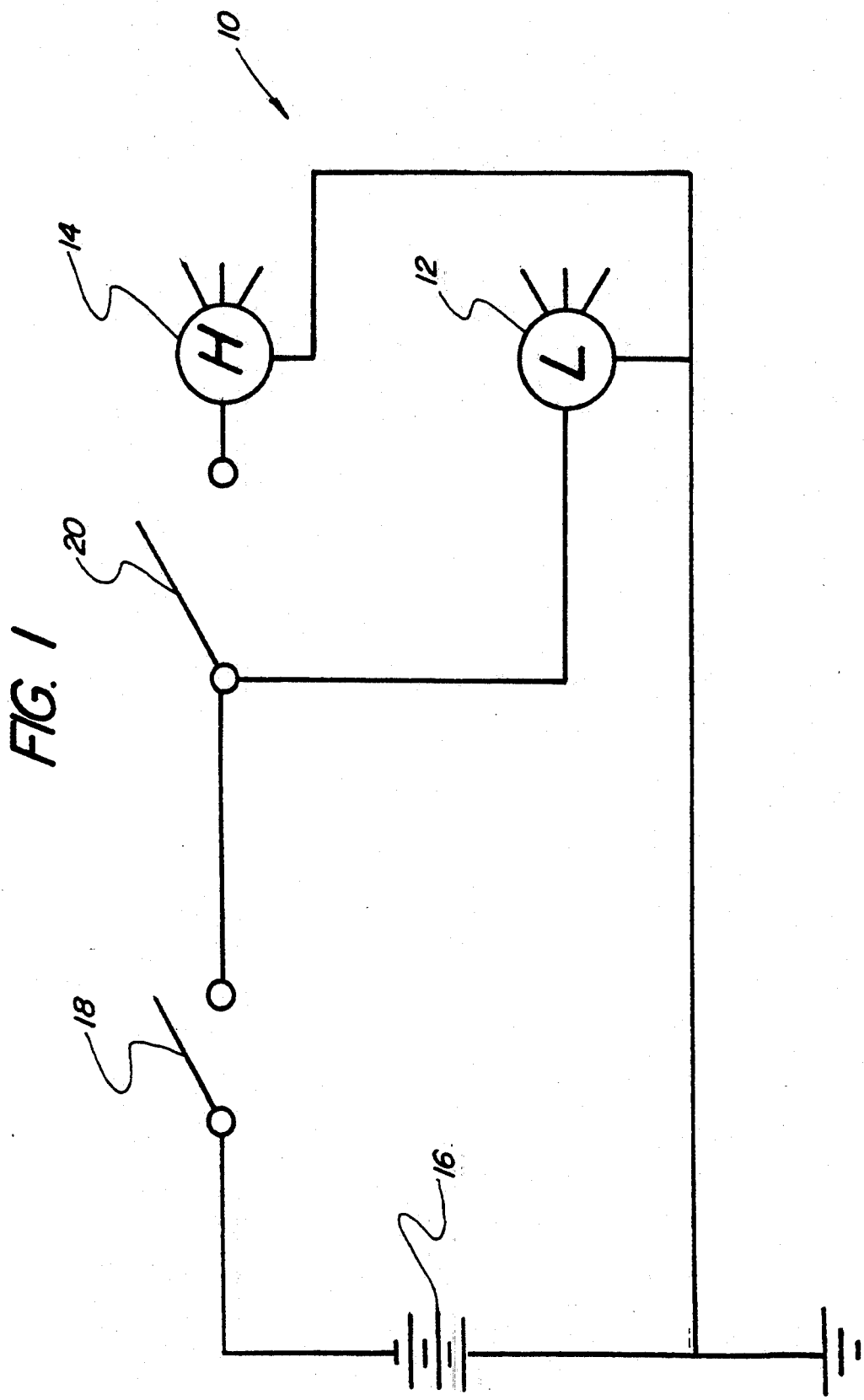
FIG. 1 is an electrical schematic of a first embodiment of the present invention.

With reference now to the drawings, and in particular to FIG. 1 thereof, a first embodiment of a new and improved headlight extender and intensifier embodying the principles and concepts of the present invention and generally designated by the reference numeral 10 will be described.

More specifically, it will be noted that presently existing dual filament headlamps are designed whereby only the low beam filament is energized at any given moment. More specifically, if only the low beam circuit is utilized, then the low beam filament provides a lower intensity supply of light from the head lamp while no power is supplied to the high beam filament. Upon an actuation of the high beam circuit, electrical power is provided to the high beam filament and all power is removed from the low beam filament.

This prior art configuration presents two problems which are addressed by the various embodiments of the present invention. The first problem involves loss of lighting power from the low beam filament upon actuation of the high beam filament. In those situations where very high light beam intensity is desired, it would be desirable to actuate both the high beam and low beam filaments simultaneously. A second problem involves the continual heating and cooling of either filament as a result of electrical power being turned on and off to the filament depending upon which beam circuit is actuated. As can be appreciated, a filament is heated to a substantially high temperature upon on actuation of the associated circuit, and then the filament cools very substantially when power is removed from the filament. This continual heating and cooling of the two filaments substantially reduces their life expectancy.

The first of these problems is addressed in the embodiment 10 of the invention as illustrated in the electrical schematic of FIG. 1. In this embodiment 10, a headlight is represented by a low beam filament 12 and a high beam filament 14 wherein each of these filaments receive electrical power from a conventional vehicle battery 16. A main headlight switch 18 is used to provide a source of electrical energy to the filaments 12, 14 in a conventional manner. When the switch 18 is closed, electrical power is provided to the low beam filament 12 so as to achieve a low beam headlight condition. A further switch 20 must be closed to supply electrical power to the high beam filament 14.

As is now apparent from reviewing FIG. 1 and contrary to a prior art circuit, when the switch 20 is closed, electrical power will be supplied to the high beam filament 14 while the same amount electrical power is still being supplied to the low beam filament 12. This provides for the concurrent actuation of both filaments 12, 14, thereby to provide for a greatly increased light intensity from the headlight bulb.

Figure 2:
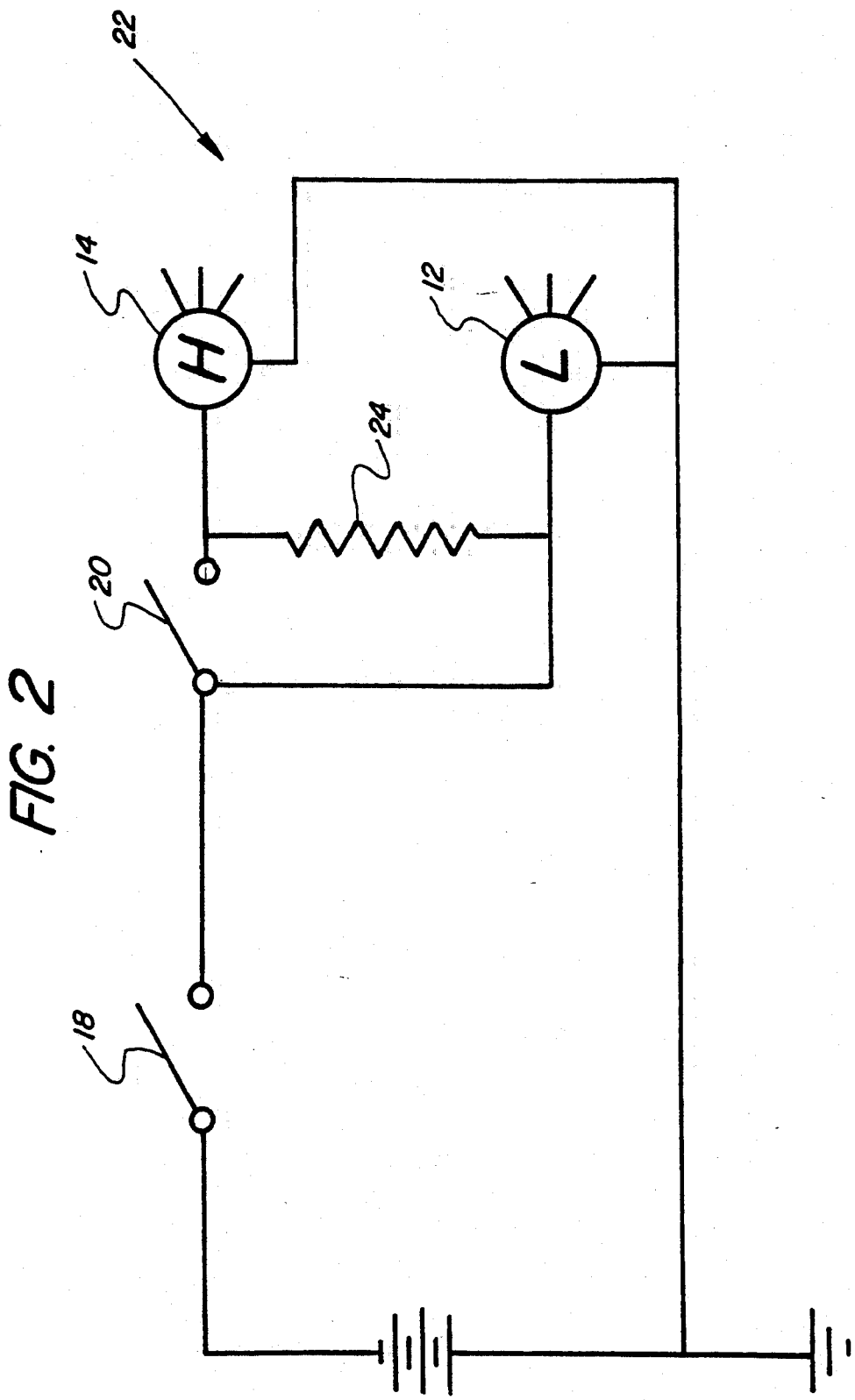
FIG. 2 is an electrical schematic of a second embodiment of the invention.

FIG. 2 of the drawings illustrates a modified embodiment of the invention which is generally designated by the reference numeral 22. This modified embodiment 22 also provides for concurrent actuation of the beam filaments 12, 14 upon a closing of both of the switches 18, 20 and further, it addresses the problem of heat shock to the high beam filament 14 upon a closing of the high beam actuation switch. The heat shock problem as discussed above is solved through the use of a resistor 24 which is electrically connected between the filaments 12, 14. Upon an actuation of the main headlight switch 18 while the switch 20 remains open, electrical power is provided to the low beam filament 12 and, through a use of the resistor 24, a small amount of electrical power is allowed to be directed through the high beam filament 14. As such, the high beam filament 14 is not illuminated but it is heated by the small amount of electrical energy passing through, thereby to prevent substantial temperature shock damage which could be occasioned by the closing of the high beam actuation switch 20.

Figure 3:
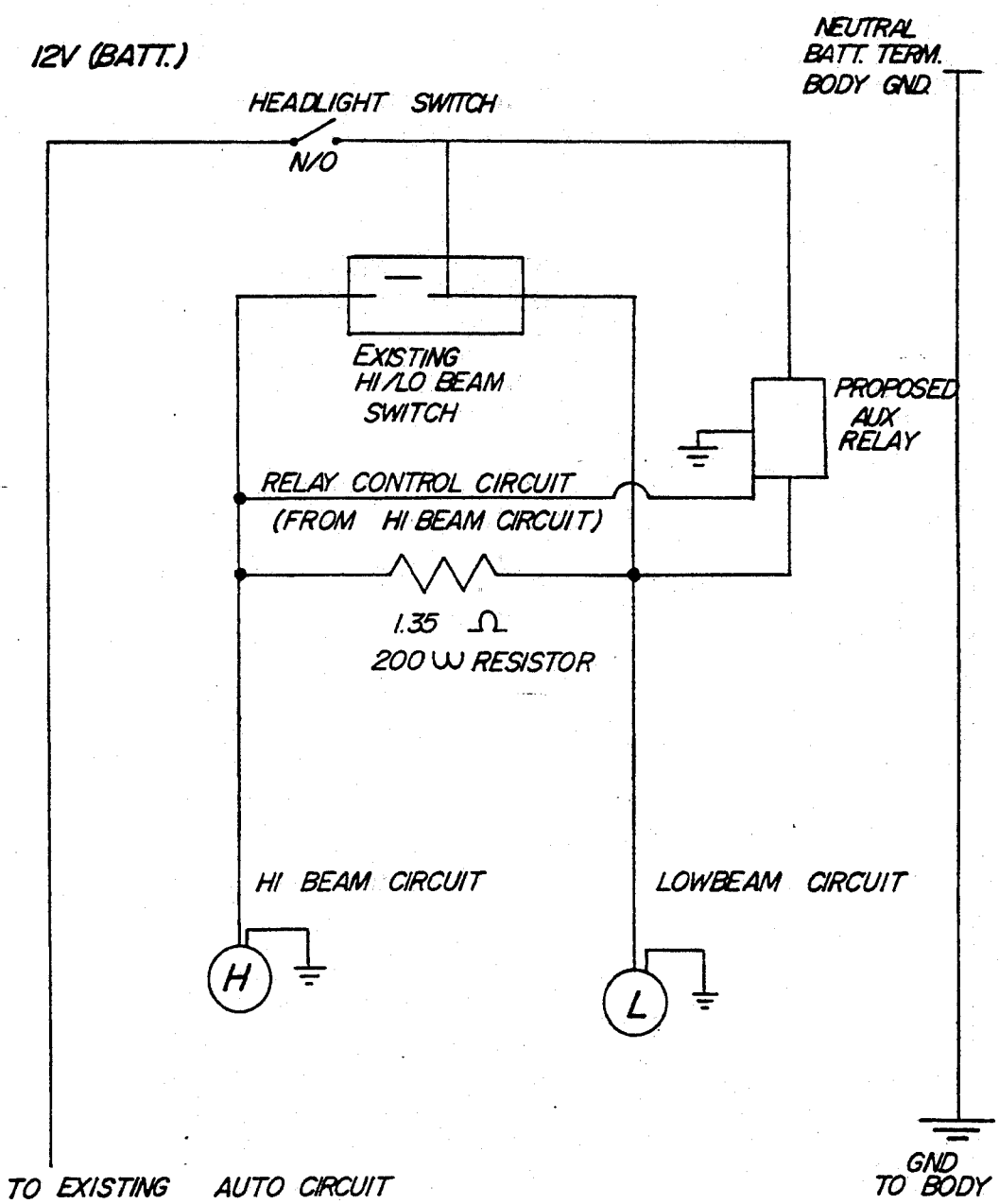
FIG. 3 is an electrical schematic of a third embodiment of the invention.

FIG. 3 of the drawings illustrates a third embodiment of the invention which is generally designated by the reference numeral 26. In this modified embodiment, an auxiliary relay 28 is utilized to provide full electrical power to the low beam filament 12 at such time as the high beam filament 14 is already activated. Specifically, when the high beam switch 20 is closed so as to feed electrical power to the high beam filament 14, electrical lead 30 directs power to the auxiliary relay 28 which then closes and acts as a switch to deliver power to the low beam filament 12, thereby to have both filaments provided with full electrical power.

Figure 4:
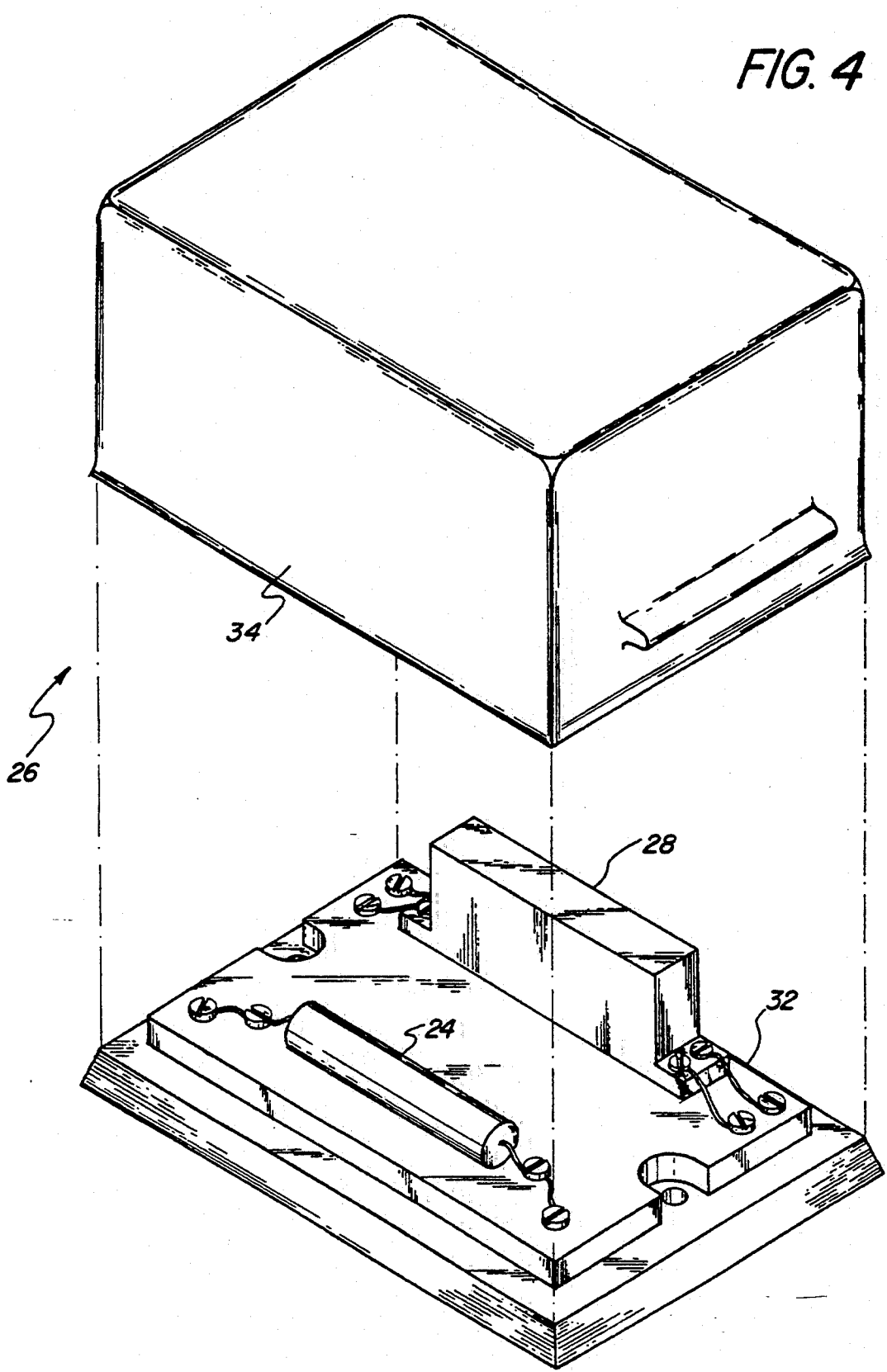
FIG. 4 is a perspective view of the third embodiment of the invention.

FIG. 4 of the drawings illustrates a housing structure which could be utilized with the third embodiment 26 of the invention. The structure would include a base 32 which could be mounted in a convenient location within a vehicle, and a snap on cover 34 would facilitate access to the auxiliary relay 28 and the resistor 24.

Figure 5:
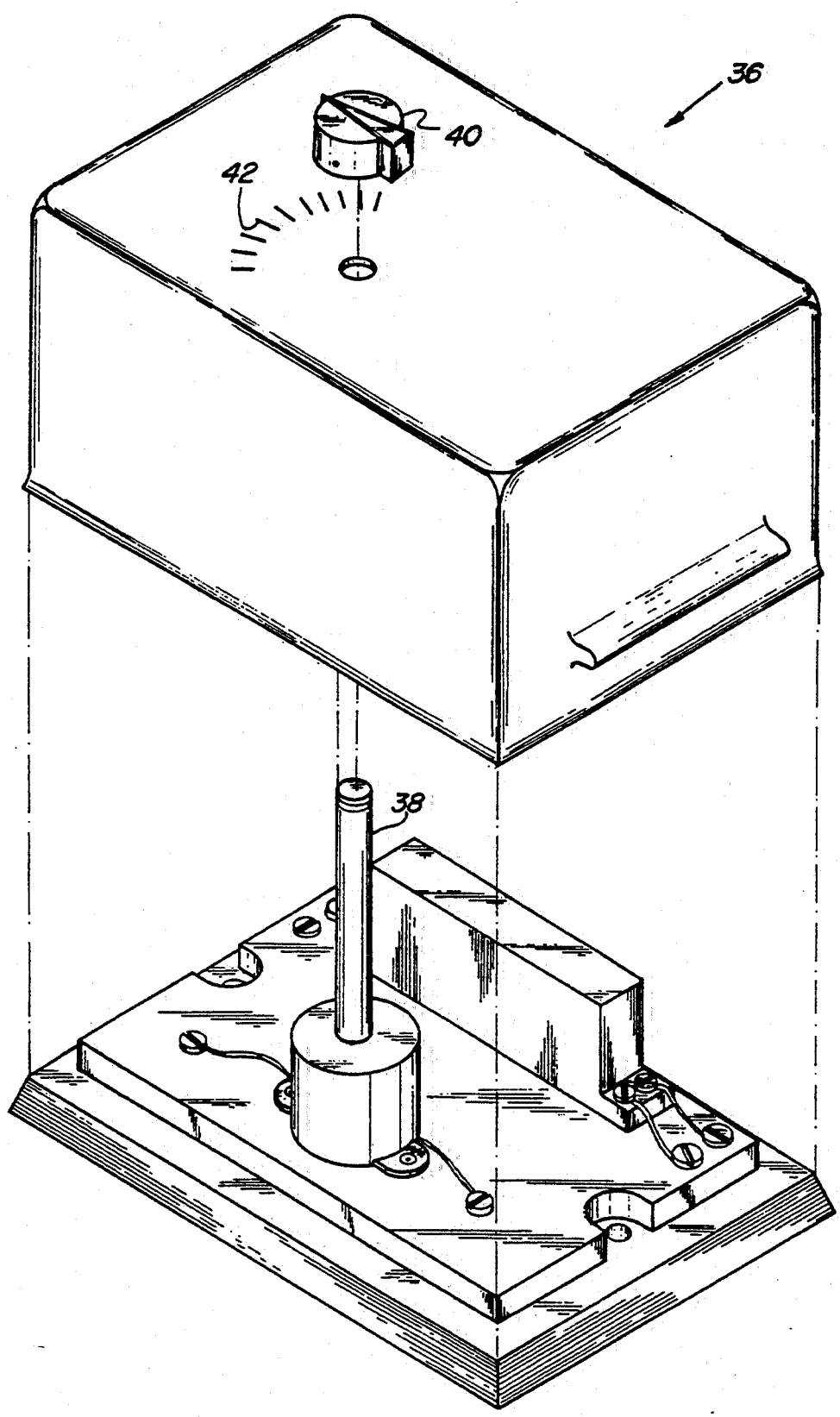
FIG. 5 is a perspective view of a fourth embodiment of the invention.

FIG. 5 of the drawings illustrates a modified version of the embodiment 26 of the invention wherein such modified embodiment is generally designated by the reference numeral 36. In this embodiment 36, the fixed resistor 24 has been replaced by a rheostat 38 to allow a user to vary the amount of resistance present between the low and high beam filaments 12, 14 respectively. A knob 40 is conventionally attachable to the rheostat 38 and a graduated scale 42 allows a selection of a desired amount of resistance, thereby to control the extent of heating betweens to filaments 12, 14.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vehicle headlight system comprising:
   at least one headlight bulb having a high beam filament and a separate low beam filament;
   a power supply switch for delivering a supply of electrical energy to said at least one headlight bulb;
   a high/low beam switch for selectively delivering said supply of electrical energy alternately between said high beam filament and said low beam filament; and
   filament pre-heating means for allowing a limited amount of said electrical energy to be delivered between said high beam filament and said low beam filament, thereby to facilitate a continual heating of said high and low beam filaments to thus reduce an effect of temperature shock damage occasioned by a sudden supplying of full electrical energy to at least one of said high and low beam filaments,
   wherein said filament preheating means comprises a resistor electrically connected between said high beam filament and said low beam filament such that electrical energy supplied to said low beam filament will leak across said resistor to cause a reduced amount of electrical energy to simultaneously flow through said high beam filament while only said low beam filament is energized by activation of said high/low beam switch;
   wherein said resistor is selectively variable in resistance; and
   further including relay means for facilitating a delivery of full electrical power to said high beam filament and said low beam filament simultaneously when only said high beam filament is energized by activation of said high/low beam switch.

2. The vehicle headlight system as described in claim 1, wherein said resistor comprises a rheostat mounted on said vehicle and connected in the lighting circuit thereof, said rheostat being enclosed in a terminal box accessible by the operator of said vehicle, said terminal box further including said relay means.

* * * * *